Oct. 26, 1965     E. J. HILICKI     3,213,931
RADIATOR OVERFLOW SYSTEM
Filed July 21, 1961
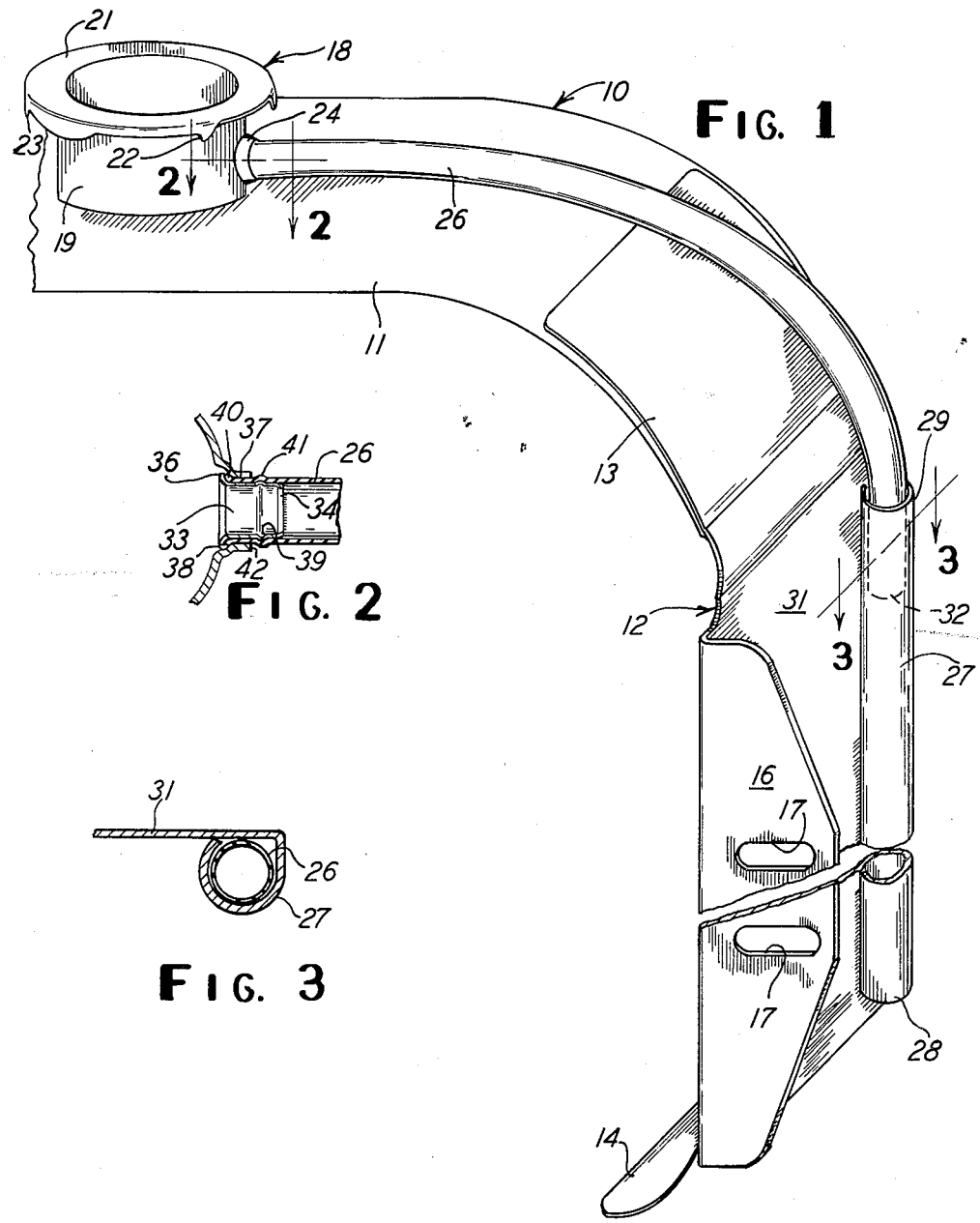
INVENTOR:
EDWIN J. HILICKI
BY: Arthur J. Donomann
ATTORNEY United States Patent Office 3,213,931
Patented Oct. 26, 1965

3,213,931
RADIATOR OVERFLOW SYSTEM
Edwin J. Hilicki, Racine, Wis., assignor to Modine Manufacturing Co., Racine, Wis., a corporation of Wisconsin
Filed July 21, 1961, Ser. No. 125,727
6 Claims. (Cl. 165—67)

This invention relates to an overflow system for a radiator used on an automobile or like vehicle.

It is an object of this invention to provide an improved radiator overflow system, and particularly it is an object to provide a less expensive but yet more trouble-free overflow system.

Another object of this invention is to provide a radiator overflow system which utilizes a part of the side member of the radiator as the overflow conduit and which also provides for the use of a rubber or other resilient tubing which can be placed in fluid-flow communication with the first conduit and which extends from the filler neck to the first conduit. In accomplishing this particular object, other objects are also accomplished, such as the radiator side member is stronger by virtue of the first conduit existing therealong as an integral part of the side member, and also the automobile manufacture can form the assembly of the rubber tubing without of course requiring elaborate equipment which is normally utilized in soldering or otherwise connecting metal tubing between the filler neck and the outlet of the overflow system. Thus, in the latter respect, no soldering or other elaborate metallurgical or mechanical connecting is required where the rubber tubing is utilized as in this invention.

Still another object of this invention is to provide a radiator overflow system which is inexpensive but yet is of a large capacity to be less likely to rust or otherwise clog, and the system is readily suceptible to a replacement of at least a part thereof if the part, namely the upper tubing, is damaged in its asembled position.

Other objects and advantages will become apparent upon reading the following description in light of the accompanying drawings wherein:

FIG. 1 is a front perspective veiw of a fragment of a radiator and the overflow system of this invention applied thereto.

FIG. 2 is an enlarged sectional view taken along the line 2—2 of FIG. 1.

FIG. 3 is an enlarged sectional view taken along the line 3—3 of FIG. 1.

The same reference numerals refer to the same parts amongst the several views.

The drawings show a portion of a conventional radiator generally designated 10 and which of course includes the standard radiator core (not shown) which is enclosed over the top by the top plate 11 and which is enclosed along the side by the side member generally designated 12. The side member 12 has the usual upper end 13 and the lower end 14, both of which normally engage the respective top and bottom portions of the radiator and which are of course attached thereto so that the radiator can be mounted on an automobile or the like vehicle. For the purpose of mounting the radiator, a conventional mounting flange 16 extends laterally of the radiator and the side member 12, and it will also be noted that the flange 16 is an integral part of the side member 12, and it includes the bolt hole openings 17 through which mounting bolts (not shown) of course pass and for engagement with the frame pieces on which the radiator is mounted in the conventional manner.

Also, a filler neck, generally designated 18 is mounted on the radiator top 11 and includes the usual cylindrical wall 19 extending directly above the top 11, and the filler neck also includes the upper flange 21 which engages the usual cap or closure (not shown) which in the well-known manner is rotated over the portion 21 to engage the projections 22 and 23 in seating the cap in the filler neck 18 in order to close the filler neck in the usual manner. Thus it will of course be understood that the filler neck 18 may have the annular projection 24 extending integrally from the wall 19 to fluid-tightly connect with the overflow conduit 26 in a manner described in more detail hereinafter. At this time it will therefore be understood that the point of location of the projection 24 is of course above the valve seat in the filler neck 18 on which seat the unshown filler cap would of course be seated in closing off the radiator in the well-known pressure closing manner such that the cap can be urged open under the pressure inside the radiator and then the coolant in the radiator will flow past the closure seat and it will then enter the overflow hose 26 to move and flow out of the radiator, all in the very well known manner.

The feature of the invention in this particular instance is the provision of a first conduit 27 which is of course in fluid-flow communication with the hose or second conduit 26 so that the conduits 26 and 27 form the overflow system from the filler neck 18 to the outlet end designated 28 at the bottom of the first conduit 27. Further, the first conduit 27 is shown to be disposed in an upright direction along the side member 12, and it of course extends between its upper end 29 and its lower end 28. Still further, it will be noted that particularly in FIG. 3 that the conduit 27 is formed as an integral part of the side member 12 in that the rear wall 31 of the member 12 continues around into its integral relation with the conduit 27 which has therefore been formed out of bending or rolling the otherwise edge or flange of the side member 12 to form the cylindrical conduit 27 as shown. In this manner the side member 12 provides its own conduit and no additional conduit need be attached thereto, and also the conduit 27 is available for strengthening the side member 12 and there is of course substantial savings in manufacturing, material and labor expense in that the conduit 27 is integral with the member 12 as described. It should also then be noted that one end of the side member 12 provides the mounting flange 16 while the other end of the side member 12 provides the conduit 27 of the overflow system.

Referring again to the hose or conduit 26, it will of course be now understood that the conduit extends between the filler neck 18 and the upper or inlet end 29 of the first conduit 27. It will also be noted that the lower end 32 of the hose 26 is telescoped within the conduit 27 and the end 32 can of course be slipped into and out of the conduit 27 as the hose 26 is simply a snug fit with the conduit 27 and this of course simplifies manufacturing and replacement assembly of the hose 26 with respect to the overflow system. The inlet and opposite end of the hose 26, that is the end adjacent the filler neck 18, is releasably attached to the filler neck 18 by means of a ferrule or ring 33 which is preferably of a metal material having a tapered inner end 34 and a flanged or capped end 36 such that the member 33 can be readily slid into the inlet end of the hose 26 to the position shown in FIG. 2 and then the entire hose or tubing 26 can be fed through the circular opening 37 in the wall 19 of the filler neck so that the entire hose 26 is pulled through the opening 37 until the hose and the member 33 are seated in the position in FIG. 2. Of course in this position, the hose 26 is fluid-tight with respect to the filler neck 18 although no elaborate soldering nor other type of connection is required, and also the hose 26 can be readily released from the filler neck 18 by simply prying the member 33 out of the opening 37 in the reverse direction of assembly.

It will also be noted that the filler neck wall 19 is provided with a recess 38 into which the flange 36 is disposed so that there is of course adequate clearance for the insertion and removal of the pressure cap on the filler neck 18.

In this relation it will therefore be understood that the outer diameter of the ferrule or member 33 is slightly in excess of the inner diameter of the rubber hose 26 such that the latter is expanded to be in a snug contact with the walls defining the opening 37. Also, the member 33 may be provided with an annular ridge 39 which forms a similar bulge or ridge 41 on the hose 26 so that the latter is placed immediately adjacent the edge 42 of the projection 24 and thus further fluid-tight relation between the hose and the filler neck is assured. Therefore, the connection between the hose and the filler neck is such that they are firmly held together and cannot be separated without prying the ferrule 33 out of the hose 26 in the reverse direction mentioned. Of course the outer diameter of the hose 26 is placed in fluid-tight contact with the wall defining the opening 37 when the ferrule 33 is disposed within the hose 26 and the stretched hose 26 therefore is of an outer diameter slightly in excess of the diameter of the opening 37 to provide for the stretched and snug fit desired, and the hose end 40 thus flares into the recess 38 in the filler neck so that the ring cap 36 and filler wall 19 grip the end 40 and prevent the hose from being pulled through the opening 37 beyond the position shown.

While a specific embodiment of this invention has been shown and described, it should be obvious that certain changes could be made in the invention, and the invention therefore should be limited only by the scope of the appended claims.

What is claimed is:

1. In a radiator overflow system, the combination comprising a radiator including a filler neck and a side member for mounting said radiator into an automobile or the like, said side member integrally including a length of material disposed in an enclosed position with a hollow interior to simultaneously serve as both a structural part and a first conduit extending in an upright position along the side of said radiator and including an open top and an open bottom for the flow of fluid therethrough, and a rubber tube releasably connected at one end to said filler neck and being in fluid-flow communication therewith and extending to said first conduit and being in fluid-flow communication with said open top thereof for conducting the flow of fluid from said filler neck to said first conduit.

2. In a radiator overflow system, the combination comprising a radiator including a filler neck with a circular opening and a side member for mounting said radiator into an automobile or the like, an integral portion of said side member being cylindrically disposed to present a first conduit extending in an upright position along the side of said radiator and including an open top and an open bottom for the flow of fluid therethrough, a rubber tube releasably connected at one end to said filler neck by extending through said opening and being in fluid-flow communication with said neck and extending to said first conduit and being releasably telescoped in said open top thereof for conducting the flow of fluid from said filler neck to said first conduit, and a ring disposed within said one end and extending through said opening and being of a diameter sufficient to fluid-tightly press said tube against said filler neck surrounding said opening.

3. A radiator overflow system comprising a radiator of the type including a filler neck with a circular opening defined by a circular wall in the side of said filler neck for the connection of an overflow tube therewith, a flexible tube of a rubber material extending between said filler neck and a side of said radiator for conducting the flow of fluid from said filler neck, one end of said tube extending through said opening and being snugly disposed with said wall defining said opening, and a ring disposed in said one end of said tube and in the plane of said wall and being of an outer diameter slightly larger than the inner diameter of said one end of said tube for urging the latter into fluid-tight contact with said wall defining said opening, said ring extending axially beyond both axial end limits of said opening and said wall and being enlarged in both of the axially extending portions immediately beyond said wall to dispose said tube into secure position with said wall.

4. A radiator overflow system comprising a radiator of the type including a filler neck with a circular opening of a given diameter and length in the wall of said filler neck for the connection of an overflow tube therewith and with said wall being recessed radially outwardly in the circular area surrounding said opening, a rubber tube disposed between said filler neck and a side of said radiator for conducting the flow of fluid from said filler neck, one end of said tube being snugly disposed in said opening, and a ring disposed inside said one end of said tube and being longer than the length of said opening and extending axially beyond both axially opposite ends of said opening and being of an outer diameter slightly larger than the inner diameter of said one end of said tube in the length extending through said opening for pressing said tube into fluid-tight contact with the circular wall defining said opening, said ring including a radially outwardly flanged end disposed outside of said tube and around the edge thereof and in the recess in said wall of said filler neck for securing said tube to said filler neck.

5. A radiator overflow system comprising a radiator of the type including a filler neck and a side member for mounting said radiator into an automobile or the like with said side member including a mounting flange in one portion thereof, said side member being cylindrical and presenting a conduit in another portion thereof, a hollow cylindrical projection on the wall of said filler neck defining a circular opening, a rubber tube extending through said circular opening in snug contact with the interior of said cylindrical projection and releasably attached at one end to said filler neck and with the other end of said tube extending into said conduit in fluid-flow communication therewith, and a cylindrical ring disposed within said tube and said projection and extending axially beyond the planes of both the axially opposite ends of said projection and being of an outer diameter sufficient to press said tube into fluid-tight contact with said projection.

6. A radiator overflow system comprising a radiator including a filler neck with a circular opening in the wall of said filler neck for the connection of an overflow tube therewith, a rubber tube with one end thereof snugly disposed in said circular opening, and a ring extending through said opening and disposed in said one end of said tube and related thereto to stretch said tube by being of an outer diameter slightly larger than the unstretched inner diameter of said one end of said tube in the length of said ring extending through said opening, the combined diameter of said ring and said tube being slightly greater than the diameter of said opening, prior to assembly in said opening, for compressing said tube into fluid-tight contact with the circular wall defining said circular opening, said ring including axially opposite ends extending axially beyond both axial ends of said wall defining said circular opening and being of a larger outer diameter on said opposite ends immediately beyond the latter said wall than on the portion intermediate said opposite ends for disposing said tube into interference fit in said opening, said larger outer diameter of the one of said ring opposite ends disposed furthest into said tube being less than the diameter of said circular opening for insertion and removal of said ring with respect to said circular opening.

References Cited by the Examiner
UNITED STATES PATENTS

| | | |
|---|---|---|
| 1,847,743 | 3/32 | Anderson. |
| 1,976,102 | 10/34 | Young et al. _____ 257—227 |
| 1,989,996 | 2/35 | Mautsch _____ 165—178 |
| 2,452,772 | 11/48 | Laughlin _____ 210—167 |
| 2,628,079 | 2/53 | Haynes et al. _____ 257—129 |
| 2,964,190 | 12/60 | Smith _____ 210—167 |
| 3,004,626 | 10/61 | Brinen _____ 257—129 |

FOREIGN PATENTS

| | | |
|---|---|---|
| 535,559 | 8/55 | Belgium. |
| 574,637 | 3/58 | Italy. |

ROBERT A. O'LEARY, *Primary Examiner.*

CHARLES SUKALO, PERCY L. PATRICK,
*Examiners.*